June 13, 1961
H. G. ANDRÉ
2,988,586
ELECTRIC STORAGE BATTERIES
Filed Oct. 5, 1955
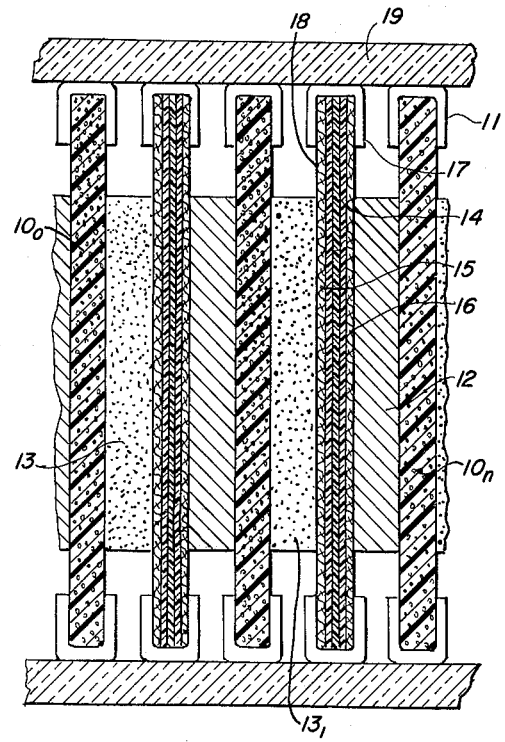
HENRI GEORGES ANDRÉ
INVENTOR.
BY
AGENT United States Patent Office 2,988,586
Patented June 13, 1961

2,988,586
ELECTRIC STORAGE BATTERIES
Henri G. André, Montmorency, France, assignor to Yardney International Corp., New York, N.Y., a corporation of New York
Filed Oct. 5, 1955, Ser. No. 538,680
Claims priority, application France Oct. 14, 1954
2 Claims. (Cl. 136—30)

My invention relates to improvements in electrical batteries, particularly (but not exclusively) accumulators or storage batteries.

A battery generally consists of a plurality of associated elements operative to generate energy through electro-chemical reactions proceeding between electro-chemically active substances of different polarities placed in an electrolytic medium.

Such elements or cells of a battery are usually interconnected by conductor wires, either directly, or else with the conductors, of the same polarity all connected to a common terminal.

In many types of batteries, the electrolyte is at least in part in liquid form and, moreover, in some operating conditions gases may be evolved from the active substance or substances and these gases must be permitted to issue out of the battery if damage to the battery is to be prevented and the risk of accidents averted. As a result, some freedom or clearance has to be provided between the constituent elements of the battery. In the gaps thus provided, even though they be so small as to be invisible to the naked eye, electrolyte will be present and parasitic electric couples (local back-potentials) are created which correspondingly reduce the electric capacity of the battery.

It is an object of this invention to provide a battery wherein the electric junction of the elements or cells is obtained by simple contact, thereby eliminating the use of wire conductors while at the same time radically averting the creation of parasitic local electric couples.

A battery according to the invention is chiefly characterized by the use of graphite, preferably in plasticized plate, strip or sheet form, as an electric connector element between the active substances of different polarities.

Regardless of the polarity of the substance with which the graphite is put in contact, it will not form an electric couple with the substance, so that, when interposed between two active substances of different polarity, it will provide an electric junction between the elements of which such substances form part, without creating parasitic potentials even in the case that some electrolyte would become interposed between the graphite and one or both of the substances and impregnate such substances, especially where the substances are in divided form.

The invention is particularly directed to a battery wherein the active substances impregnated with electrolyte constitute a medium under pressure, an example of such a system being provided e.g. by a silver-zinc accumulator. The invention is particularly applicable to batteries or accumulators of this type which operate at a slow rate of charge and discharge, as described for example in my pending U.S. application Ser. No. 506,263, filed May 5, 1955, now Patent No. 2,906,802.

The invention further includes, as new articles of manufacture, inserts adapted to be interposed between adjacent elements of an electric battery and comprising a sheet or plate of graphite-base material. In a preferred embodiment of such insert, the said plate includes a marginal part effective to inhibit migration of the electrolyte and desirably comprising a coating of paraffin.

Such insert, while providing the desired electric bond or connection between two adjacent elements of the battery, will avert the formation of short circuits because, even if gases were evolved during certain operating phases of the battery, no parasitical circuits will be set up as a result of a migration of the electrolyte caused by such gases, owing to the migration-inhibiting effect achieved by the paraffin or similar substance provided along the edge portions of the insert.

An insert of the character described may desirably be used in a battery including as a constituent thereof a semi-permeable separator element of the kind disclosed in my co-pending U.S. patent application Ser. No. 521,575, filed July 12, 1955, now Patent No. 2,890,261, which separator element according to that application may comprise a paraffin-coated marginal part.

A battery according to this invention will then comprise a stack of elements of different kinds, viz. electrochemically active substances, separator elements interposed between the active substances of opposite polarity and permitting the progress of electro-chemical reactions between said substances, electrolyte-impregnated absorbing sheets and inserts interposed between adjacent elements for providing an electrical connection between them. Such improved battery will further include the feature that the flat constituent elements thereof, i.e. plates, discs or the like, other than those comprising the electro-chemically active substances, i.e. other than the electrodes proper, project beyond the latter substances and have hydrophobic marginal parts opposing migration of the electrolyte, e.g. impregnated or coated with paraffin, so that the electrolyte is confined within the central parts of the battery where it will play the part of an ion-conveying medium but will not have any access to the peripheral or marginal parts, thereby preventing short circuits between the electrical elements. The electrolyte thus will remain out of contact with the walls of the battery casing so that the battery will resemble in aspect and properties a dry battery while actually containing a liquid electrolyte with all the attendant advantages thereof.

In manufacturing a conductive insert adapted to be interposed between two electrical elements of a battery, the following procedure may be used: First a solution is prepared of a plastic material, for example a solution of polystyrene in benzene or chloroform, in a proportion of e.g. about 15 parts of the plastic for 100 parts of the solvent. Separately graphite is ground and the resulting powder is added to the solution in substantially a one-to-one ratio by weight of the plastic. The mixture is agitated for a few minutes and the homogeneous composition is poured on a perfectly flat, smooth and horizontal plate of glass, porcelain or similar material. The substance will spread in a regular way and form a plate or sheet. The latter is allowed to dry for two or three days and then cut to the requisite dimensions.

Such sheets are used as inserts in a battery according to the invention, one exemplary embodiment of which will now be described with reference to the accompanying drawing. A sheet of carbonized plastic produced as just described, designated by the reference numeral 10 on the drawing, having its marginal portions lined with paraffin or the like as shown at 11, is interposed between a strip or sheet of zinc 12 and a strip of opposite polarity, desirably sintered silver powder, indicated at 13. The dimensions of the insert are preferably greater than those of the sheets or strips of the active substances which they are intended to separate. The zinc sheet 12 is separated from the silver strip $13_1$ in the adjacent element by a semi-permeable separator which may be of the type disclosed in my aforementioned co-pending U.S. patent application Ser. No. 521,575, comprising one or more sheets of cellophane or regenerated cellulose 14 sandwiched between two sheets of paper 15 and 16, which may be blotting paper or ordinary typewriting paper; such combination has proved to be highly satisfactory. This sandwich arrangement is assembled in a permanent manner by means of an overlapping border lining 17 comprising a varnish material such as paraffin. The separator 18 thus produced is substantially coextensive with the insert 10. The whole assembly of the active and separator materials is impregnated with electrolyte, desirably a concentrated aqueous solution of zinc chloride, as described in my aforementioned co-pending U.S. patent application Ser. No. 506,263, and is immersed in a casing 19. The separators and inserts are in contact with the casing exclusively through their paraffin-coated edges. The active electrode assembly, consisting of the electrochemically active substances and the parts of the separators upon whose opposite sides they bear, is placed by the surrounding casing (not shown) under a pressure effective to secure an intimate contact between the adjacent surfaces. The ends of the block are provided by two graphite inserts $10_o$ and $10_n$ connected by wire conductors (not shown) to the battery terminals.

Should gases evolve during the electro-chemical reactions, such gases will in all cases be allowed to discharge since at no point is there provided a tight seal enclosing the active substances. The electrolyte-impregnated active substances, in particular, are simply urged against each of the opposite sides of an insert but are not bonded thereto. High local pressures liable to expel the liquid electrolyte out of the central area in which it is confined cannot occur.

What I claim is:

1. An electric battery comprising a casing, a plurality of cells forming a stack in said casing and including each a positive electrode, a negative electrode and an electrolyte-permeable separator between said electrodes, intercell connector means in said stack including a conductive insert between each pair of adjoining cells, said insert being in conductive contact with the positive electrode of one cell and with the negative electrode of the other cell of said pair, and a pair of terminal plates positioned at opposite ends of said stack in conductive contact with the outermost electrodes thereof, respectively, said insert, said separator and said terminal plates bridging opposite casing walls and making fluid-tight contact therewith, said positive and negative electrodes being each spaced from said opposite casing walls whereby electrolyte-confining spaces are formed around all of said electrodes between said insert, said separator and said terminal plates.

2. A battery according to claim 1 wherein marginal portions of said terminal plates, said insert and said separator, projecting beyond said electrodes and engaging said casing walls, are provided with hydrophobic coatings preventing migration of electrolyte along said walls.

References Cited in the file of this patent

UNITED STATES PATENTS

| | | |
|---|---|---|
| 1,658,062 | Sprague | Feb. 7, 1928 |
| 1,662,866 | Salazar | Mar. 20, 1928 |
| 1,765,673 | Huntley | June 24, 1930 |
| 1,920,151 | Ruben | July 25, 1933 |
| 2,516,091 | Renaud | July 18, 1950 |
| 2,519,054 | Woodring | Aug. 15, 1950 |
| 2,583,063 | Richardson | Jan. 22, 1952 |
| 2,677,151 | Jeannings | May 4, 1954 |
| 2,689,877 | Briggs | Sept. 21, 1954 |
| 2,708,684 | Grieve | May 17, 1955 |
| 2,740,821 | Bone | Apr. 3, 1956 |